(12) United States Patent  
Mirabella et al.

(10) Patent No.: US 12,153,216 B1  
(45) Date of Patent: Nov. 26, 2024

(54) ELECTRONIC DEVICES WITH OPTICAL COMPONENT PROTECTION

(71) Applicant: Apple Inc., Cupertino, CA (US)

(72) Inventors: Anna V. Mirabella, Palo Alto, CA (US); Forrest C. Wang, Petaluma, CA (US); Victoria C. Chan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 562 days.

(21) Appl. No.: 17/330,089

(22) Filed: May 25, 2021

Related U.S. Application Data (60) Provisional application No. 63/050,030, filed on Jul. 9, 2020.

(51) Int. Cl.
| | |
|---|---|
| *G02B 27/01* | (2006.01) |
| *G02C 7/08* | (2006.01) |
| *G02C 7/10* | (2006.01) |
| *G09G 3/00* | (2006.01) |

(52) U.S. Cl.  
CPC ..... *G02B 27/0172* (2013.01); *G02B 27/0176* (2013.01); *G02C 7/086* (2013.01); *G02C 7/102* (2013.01); *G02B 2027/0178* (2013.01); *G09G 3/003* (2013.01); *G09G 2330/04* (2013.01); *G09G 2360/144* (2013.01)

(58) Field of Classification Search  
CPC ............ G02B 27/0172; G02B 27/0176; G02B 2027/0178; G02C 7/102; G09G 2330/04; G09G 2360/144  
See application file for complete search history.

(56) References Cited

U.S. PATENT DOCUMENTS

| | | | |
|---|---|---|---|
| 8,724,206 B2 | 5/2014 | Spitzer et al. | |
| 9,229,237 B2 | 1/2016 | Margulis et al. | |
| 9,995,933 B2 | 6/2018 | Alton et al. | |
| 2016/0320621 A1 | 11/2016 | Biteau et al. | |
| 2017/0212352 A1 | 7/2017 | Cobb et al. | |
| 2018/0239143 A1* | 8/2018 | Goossens | G02B 27/0172 |
| 2018/0267575 A1* | 9/2018 | Sullivan | G02B 26/02 |
| 2019/0179149 A1* | 6/2019 | Curtis | G02B 27/01 |
| 2019/0278086 A1 | 9/2019 | Ofir | |
| 2019/0302445 A1* | 10/2019 | Cho | G02B 5/005 |
| 2020/0018963 A1 | 1/2020 | Osterhout | |
| 2020/0033560 A1* | 1/2020 | Weber | G02B 7/14 |
| 2020/0081253 A1* | 3/2020 | Montevirgen | G02B 27/0172 |

* cited by examiner

*Primary Examiner* — Paisley L Wilson  
(74) *Attorney, Agent, or Firm* — Treyz Law Group, P.C.; Tianyi He (57) ABSTRACT

An electronic device such as a head-mounted device may have a head-mounted housing that separates an exterior region from an interior region. Optical modules may be mounted in alignment with openings in the rear of the housing. Each optical module may have a display and a lens through which an image on the display may be viewed. To protect the optical modules, the head-mounted device may be provided with photochromic lenses that darken and block sunlight when exposed to ultraviolet light and/or may be provided with shutters, lens caps, protective movable housing portions, tunable lenses that can be adjusted to defocus sunlight, and/or other protective structures for protecting lenses from scratches and for protecting displays from damage due to excessive sunlight exposure. Electrically adjustable protective structures may be operated based on sensor measurements.

20 Claims, 9 Drawing Sheets

ELECTRONIC DEVICES WITH OPTICAL COMPONENT PROTECTION

This application claims the benefit of provisional patent application No. 63/050,030, filed Jul. 9, 2020, which is hereby incorporated by reference herein in its entirety.

FIELD

This relates generally to electronic devices, and, more particularly, to head-mounted electronic devices.

BACKGROUND

Electronic devices such as head-mounted devices may have optical components such as displays and lenses through which the displays may be viewed. Optical components such as these may be subject to wear or damage if mishandled.

SUMMARY

An electronic device such as a head-mounted device may have a head-mounted housing that separates an exterior region from an interior region. Optical modules may be mounted within the interior region in alignment with openings in the rear of the housing. Each optical module may have a display and a lens through which an image on the display may be viewed by a user.

To protect the optical modules, the head-mounted device may be provided with photochromic lenses that darken and block sunlight when exposed to ultraviolet light. During normal operation, the openings in the rear of the hosing and the optical modules are covered by portions of the user's face. This prevents ultraviolet light from reaching the photochromic lenses, so the lenses assume their clear state. If desired, circular polarizers may be incorporated into the lenses to help block light reflections that could cause display damage.

In some arrangements, optical module protection may be provided using protective structures such as shutters, lens caps, protective movable portions of the head-mounted housing, tunable lenses that can be adjusted to defocus sunlight, and/or other protective arrangements for protecting lenses from scratches and/or for protecting displays from damage due to excessive sunlight exposure. Electrically adjustable protective structures may be operated in a first mode in which images from the displays pass through the lenses and through the openings in the rear of the housing to eye boxes for viewing by the user and may be operated in a second mode in which the electrically adjustable structures protective protect the optical modules (e.g., by preventing sunlight from passing through the openings in the rear of the housing to the displays, etc.).

Sensors may be provided in a head-mounted device. The sensors may include photodetectors (e.g., photodiodes, etc.) that detect light such as sunlight, temperature sensors, gaze tracking sensors that can detect ambient light in addition to tracking a user's gaze, motion sensors and switches that can detect when the head-mounted device is being used, etc. Using sensor information, the head-mounted device can place electrically adjustable protective structures into first and second modes of operation. For example, the head-mounted device may switch protection into use in response to detecting that an undesired condition has occurred that may lead to optical module damage, may switch protection off in response to detecting that a user desires to use the head-mounted device to view images and/or in response to detecting that the undesired condition is absent, etc. Manual adjustments may also be made to physically and/or electrically adjustable protective structures.

DETAILED DESCRIPTION

Electronic devices such as head-mounted devices have displays for presenting images to a user. Displays may be mounted in optical modules that include lenses for viewing images on the displays.

Optical components in a head-mounted device such as displays and lenses may be adversely affected if mishandled. For example, exposed lens surfaces may be scratched if exposed to sharp objects. Displays have sensitive structures such as pixel structures with organic thin-film layers that can be damaged if exposed to excessive sunlight.

To protect optical components from damage, a head-mounted device may be provided with protective structures. The protective structures may help prevent exposure of displays and other components to excessive sunlight and/or may help prevent lenses from being scratched when mishandled.

Figure 1:
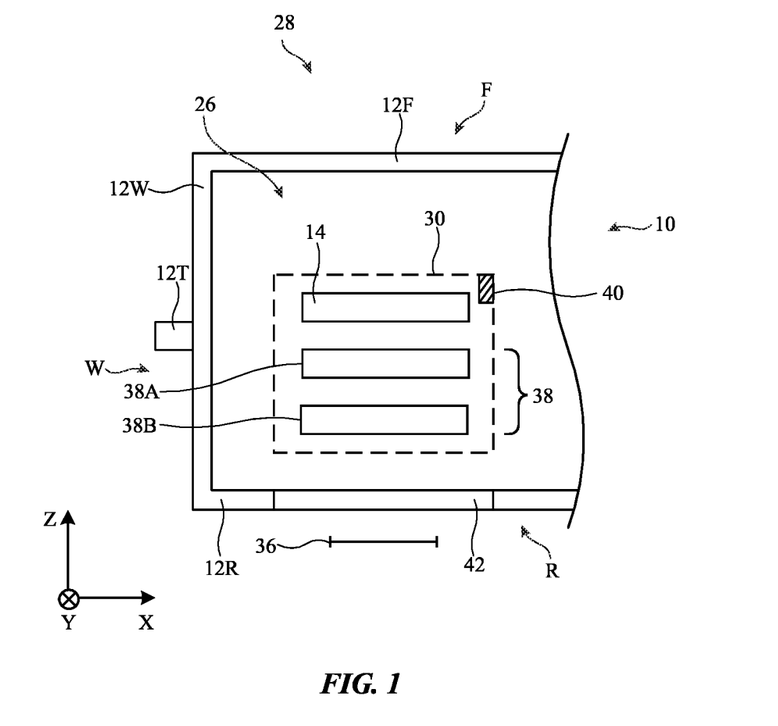
FIG. 1 is a top view of an illustrative electronic device in accordance with an embodiment.

A top view of an illustrative electronic device of the type that may be provided with protective structures is shown in FIG. 1. Electronic device 10 of FIG. 1 may be a head-mounted device or other suitable device. As shown in FIG. 1, device 10 may have a housing such as housing 12. Housing 12, which may sometimes be referred to as a housing wall, external housing, housing structures, support structures, head-mounted support structures, housing layer, etc., may be formed from materials such as polymer, glass, metal, crystalline materials such as sapphire, ceramic, fabric, foam, wood, other materials, and/or combinations of these materials.

Device 10 may have any suitable shape. Housing 12 may, for example, be configured to form a head-mounted housing in the shape of a pair of goggles (e.g., goggles having optional head straps such as straps 12T), the shape of a pair of glasses, and/or other head-mounted structures. Arrangement in which housing 12 forms a pair of goggles may sometimes be described herein as an example.

As shown in FIG. 1, housing 12 may separate interior region 26 from exterior region 28. Housing 12 may include portions such as front portion (front wall) 12F on front face F of device 10, rear portion (rear wall) 12R on opposing rear face R of device 10, and sidewall portions such as sidewall portions 12W that extend between front portion 12F and rear portion 12R so that housing 12 encloses interior region 26. When worn by a user, rear portion 12R may rest on or near the face of a user so that the user's eyes are located in eye boxes 36. Housing portions 12F and 12R may be planar, curved, may have planar and curved portions, and/or may have other suitable shapes. Housing 12 may be formed from opaque materials. For example, portion 12F may be opaque. To allow a user of device 10 to view their surroundings, device 10 may, if desired, be provided with one or more forward-facing cameras. During operation, these cameras may capture images of the real world (e.g., so that these images may be displayed for a user and may optionally be merged with computer-generated information that is being displayed for a user).

Electrical and optical components may be mounted within housing 12 (e.g., in interior region 26). These components may include sensors and other input-output devices, control circuitry, etc. The components of device 10 may include optical modules such as optical module 30. There may be left and right optical modules 30 in device 10, respectively aligned with left and right eye boxes 36. During operation, the optical modules provide images to the eye boxes for viewing by a user (e.g., a user whose eyes are located in the eye boxes). FIG. 1 shows an illustrative left-hand portion of device 10 and a left-hand optical module 30 and left-hand eye box 36.

As shown in FIG. 1, each optical module 30 may include a display such as display 14 and a corresponding lens 38 that provides an image from display 14 to a corresponding eye box 36 through a corresponding opening in rear portion 12R such as opening 42. A single opening such as opening 42 may span the left and right optical modules in device 10 or there may be a pair of openings 42 including a left-hand opening that is aligned with a left optical module and a right-hand opening that is aligned with a right optical module.

If desired, optical modules such as optical module 30 of FIG. 1 may include gaze tracking systems such as gaze tracking system 40. Gaze tracking system 40, which may operate through lens 38, may include a light source. The light source may include visible and/or infrared light-emitting devices (e.g., light-emitting diodes and/or lasers). The light sources may provide blanket illumination for a user's eye in an associated eye box 36 and/or may produce light beams that create reflections (sometimes referred to as glints). Gaze tracking system 40 may include one or more visible and/or infrared image sensors that are used to monitor the user's eye in eye box 36 through lens 38. Data from the image sensor(s) may be used to measure pupil shape, to measure the pattern of glints on a user's eye, to gather iris scan information, and/or to gather retinal information (as examples). By processing measurement such as pupil shape measurements, glint patterns, or other eye information, gaze tracking system 40 can determine the direction in which the user's eye is oriented (e.g., the user's direction of view, sometimes referred to as the user's gaze or gaze direction).

Lens 38 may include a fixed lens such as fixed lens 38A and an optional removable lens such as lens 38B. Lens 38A may be formed from one or more refractive lens elements, may be a folded optical path lens (e.g., a catadioptric lens), may be a Fresnel lens, may be a holographic lens, and/or may be any other suitable lens. Removable lens 38B may be any suitable type of lens (e.g., a lens formed from a single refractive lens element or multiple refractive lens elements) and may serve as a user-specific vision-correction lens that is configured to correct for a user's vision impairments (e.g., e.g., refractive errors such as astigmatism, myopia, and/or hyperopia). Lens 38B may be a fixed lens (e.g., a lens with a fixed lens power) or may, if desired, include an electrically adjustable lens element (e.g., a tunable lens such as an adjustable liquid crystal lens or other lens with a controllable lens power).

Figure 2:
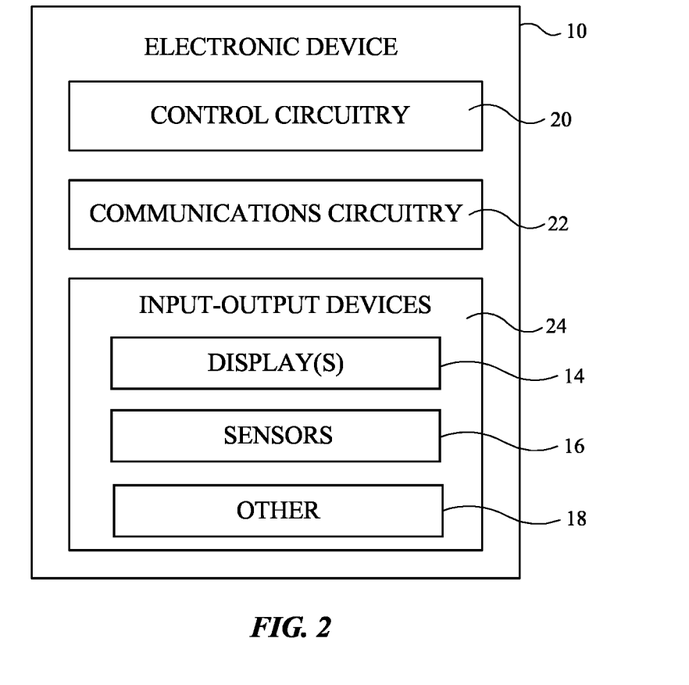
FIG. 2 is a schematic diagram of an illustrative electronic device in accordance with an embodiment.

A schematic diagram of an illustrative electronic device such as device 10 of FIG. 1 is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections) and/or may be used to receive such information from external electronic devices. Each of these external devices may include components of the type shown by device 10 of FIG. 2.

As shown in FIG. 2, electronic device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid-state drive), volatile memory (e.g., static or dynamic random-access-memory), etc. Processing circuitry in control circuitry 20 may be used to gather input from sensors (e.g., cameras) and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Electronic components such as input-output devices 24 may be used in gathering user input, in gathering information on the environment surrounding the user, and/or in providing a user with output.

Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, optical sensors such as self-mixing sensors and light detection and ranging (lidar) sensors, humidity sensors, moisture sensors, gaze tracking sensors, electromyography sensors to sense muscle activation, facial sensors, interferometric sensors, time-of-flight sensors, magnetic sensors, resistive sensors, distance sensors, angle sensors, and/or other sensors. In some arrangements, device 10 may use sensors 16 and/or other input-output devices 24 to gather user input. For example, input-output devices 24 such as buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable structures in device 10, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

During use of device 10, lens 38 may be vulnerable to scratches if mishandled. Display 14 may contain sensitive components such as pixel structures that can be adversely affected if exposed to excessive ultraviolet and/or visible sunlight (e.g., if device 10 were to be left in the sun for too long with lenses 38 facing upwards towards the sun so that sunlight is focused onto display 14). To protect device 10 from lens scratches and/or display damage from sun exposure, device 10 may be provided with protective structures. These protective structures may include a photochromic lens layer and/or other structures that may selectively block solar radiation and thereby protect display 14 from overexposure, may include electrically adjustable protective structures, may include mechanical protective structures such as lens-covering structures that help prevent lens 38 from becoming scratched when mishandled, and/or may include other protective structures.

Figure 3:
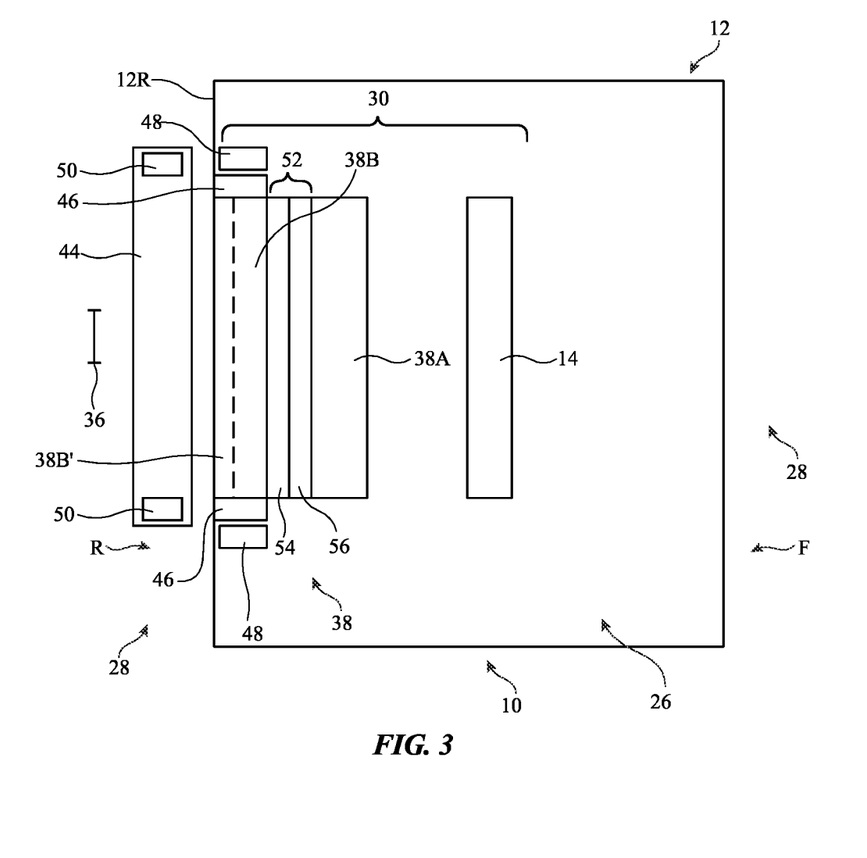
FIG. 3 is top view of an illustrative electronic device with structures for protecting a display in accordance with an embodiment.

Consider, as an example, device 10 of FIG. 3. As shown in FIG. 3, device 10 may include a housing such as housing 12 that separates exterior region 28 from interior region 26. Optical module 30 and lens 38 and display 14 of optical module 30 may be mounted in interior 26 in alignment with an opening in rear housing portion 12R (see, e.g., opening 42 of FIG. 1).

During normal operation, display 14 creates an image. A user whose eye is located in eye box 36 can view the image through lens 38. Lens 38 may include lens 38A (e.g., a fixed lens that is permanently mounted in housing 12) and optional vision-correction lens 38B. Lens 38B may have structures that allow lens 38B to be removably mounted to device 10. For example, lens 38B may have magnets 46 that are attracted to magnets 48 that are permanently attached to housing 12, thereby allowing lens 38B to be removed. This removable lens arrangement allows lens 38B to serve as a user-selected vision correction lens.

To prevent lens scratches and to help block sunlight from display 14 when device 10 is not in use, device 10 may have a lens covering structure such as lens cover 44. Lens cover 44 may be, for example, a lens cap that has magnets 50 that mate with corresponding magnets 48 in housing 12. A user can remove lens cover 44 when it is desired to operate device 10 normally to view images and can place lens cover 44 over optical module 30 when device 10 is not in use. If desired, device 10 may be provided with a lens covering structure (e.g., part of housing 12) that slides, rotates, bends about a hinge, and/or otherwise moves to open and close the rear of lens 38.

Internal reflections in lens 38 that have the potential to create stray light and/or light that could adversely affect display 14 (e.g., bright reflections of ambient sunlight) may be suppressed by optional circular polarizer 52. Circular polarizer 52 may include a linear polarizer layer such as linear polarizer 54 that is between lens 38B and lens 38A and may include a wave plate such as quarter wave plate 56 that is between linear polarizer 54 and lens 38A. With this type of arrangement, incoming ambient light that passes from region 28 towards region 26 through lens 38B will be linearly polarized by linear polarizer 54, will be converted into circularly polarized light by quarter wave plate 56 and, when reflected outwardly from lens 38A, will pass through quarter wave plate 56 before being absorbed by linear polarizer 54. In effect, circular polarizer 52 will serve as a reflection suppression layer that absorbs outwardly propagating reflections from components such as lens 38A and thereby prevents this reflected light from reflecting back into device 10 towards display 14. This may help prevent damage to display 14. At the same time, the presence of circularly polarizer 52 will allow display light (images) from display 14 to pass to eye box 36 for normal viewing.

In addition to or instead of using protective arrangements with circular polarizers to suppress stray light reflections and/or mechanical lens protectors, device 10 may be provided with optical components that help protect device 10. As an example, lens 38 may be a photochromic lens (e.g., lens 38B and/or lens 38A may be photochromic lenses). If desired, lens 38A and/or 38B may be provided with a photochromic coating (e.g., optional photochromic coating layer 38B') and/or photochromic material may be incorporated into the bulk material (glass, polymer, etc.) that forms the lens elements in lenses 38A and/or 38B. Arrangements in which a photochromic layer is formed between lens 38A and display 14 or that otherwise are aligned with optical modules 30 may also be used.

Figure 4:
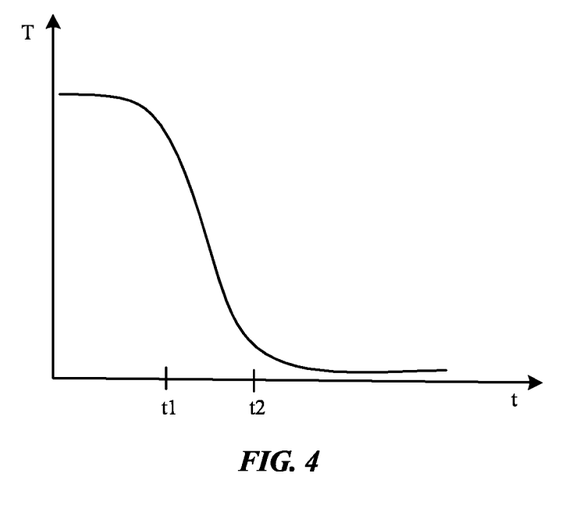
FIG. 4 is a graph showing how light transmission through a photochromic material may be reduced when the photochromic material is exposed to sunlight in accordance with an embodiment.

Photochromic material (e.g., polymer or glass incorporating photosensitive dye such as triarylmethane or other photosensitive material) is characterized by a change in light transmission as a function of exposure to ambient light (e.g., ultraviolet light). As shown by the graph of FIG. 4, the transmission T of a photochromic lens may decrease as a function of time following exposure to ultraviolet light. At times before time t1 of the graph of FIG. 4, for example, the light transmission of the photochromic material may be high (e.g., above 70%, above 85%, above 95%, etc.). After being exposed to ambient light (e.g., sunlight, which contains ultraviolet light, in a scenario in which a user leaves device 10 lying in the sun), the value of transmission T decreases. After a few seconds or minutes (e.g., time t2 of FIG. 4), the photochromic material may darken so that light transmission T through the photochromic material and lens 38 is reduced to a relatively low value (e.g., less than 50%, less than 35%, less than 15%, less than 5%, or other suitable reduced amount). The reduced light transmission value may help block sunlight and other ambient and may therefor prevent sunlight or other ambient light from reaching display 14 and potentially damaging sensitive components in display 14. If, as an example, display 14 is an organic light-emitting diode display with organic light-emitting diodes having thin-film organic layers, the blocking of light from display 14 may help ensure that the thin-film organic layers are not exposed to excessive solar radiation or other ambient light. Photochromic material need not be powered by a battery and therefore can darken to protect display 14, regardless of whether the battery in device 10 is charged. Once ultraviolet light exposure ceases (e.g., when a user places device 10 on the head of the user so that the user's face shadows lenses 38), the darkening of the photochromic lenses in device 10 reverses (e.g., the lenses become clear so that images from display 14 can be viewed by the user).

Figure 5:
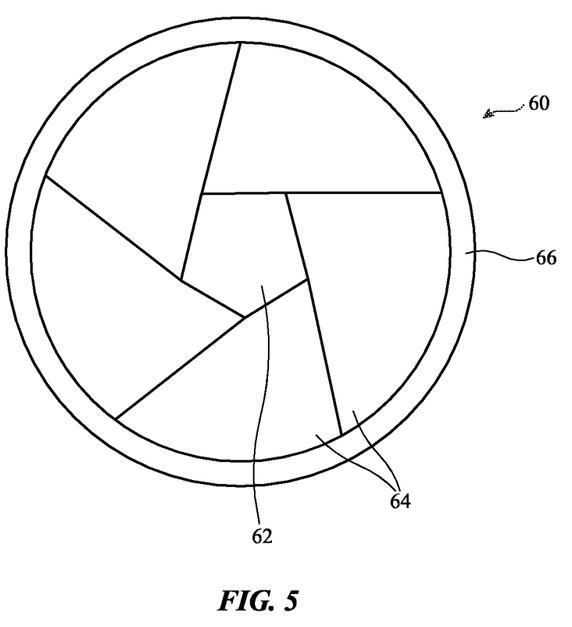
FIG. 5 is a diagram of an illustrative shutter in accordance with an embodiment.

FIG. 5 shows how light may be selectively blocked from display 14 using an adjustable structure such as an adjustable diaphragm. Diaphragm 60 of FIG. 5 may be placed where shown by cover 44 of FIG. 3 (e.g., between lens 38 and eye box 36), between lenses 38A and 38B, or between lens 38 and display 14 (as examples). In an illustrative example, adjustable diaphragm 60 has a ring-shaped actuator 66 that can be electrically controlled by control circuitry 20. Arrangements in which diaphragm 60 is manually controlled may also be used.

When control circuitry 20 desires to open an electrically adjustable diaphragm such as diaphragm 60 (e.g., to permit normal operation of device 10 for viewing images on displays 14), blades 64 may be rotated in a first direction (e.g., by actuator 66), thereby enlarging opening 62. When control circuitry 20 desires to close diaphragm 60 (e.g., when normal operation is complete and device 10 is being powered down for storage, etc.), blades 64 may be rotated in a second direction (e.g., by actuator 66), thereby partly or fully closing opening 62 and blocking light from display 14.

If desired, one or more sensors 16 in device 10 may be used to sense conditions that warrant opening and closure of diaphragm 60 and/or deactivation and activation of other protective measures. For example, device 10 may use a light sensor to detect the presence of strong light at display 14. The light sensor may be a photodiode located on or near a display substrate that is used in forming display 14. Gaze tracking system 40 (e.g., an image sensor in system 40, a photodiode on the image sensor substrate in system 40, a photodiode packaged with the image sensor in system 40, etc.) may also be used to detect when strong light is entering interior 26 and is potentially over-exposing display 14. In another illustrative configuration, sensors 16 may include a light sensor with a layer of phototropic polymer that supplies an output signal indicative of the direction of rays of light from the sun (or other strong ambient light source). If it is determined that incoming light may reach display 14, diaphragm 60 may be closed by control circuitry 20 or other protective measures may be taken. If desired, display 14 may be supplied with a temperature sensor. In the event that excessive temperature in display 14 is detected, control circuitry 20 can conclude that excessive sunlight on display 14 may be present and may close diaphragm 60 or take other protective measures. Diaphragms such as diaphragm 60 may also be controlled manually, if desired.

In addition to using an electrically and/or manually controlled light-blocking device such as diaphragm 60, each optical module 30 may be provided with other electrically adjustable shutters (e.g., a liquid crystal shutter that can be placed in transparent and opaque states by electrical control signals, a microlouver device with electrically adjustable louvers that pass or block light, a shutter formed from a moving flap, rotating member, or sliding barrier, etc.). The diaphragm-type shutter of FIG. 5 is illustrative.

Figure 6:
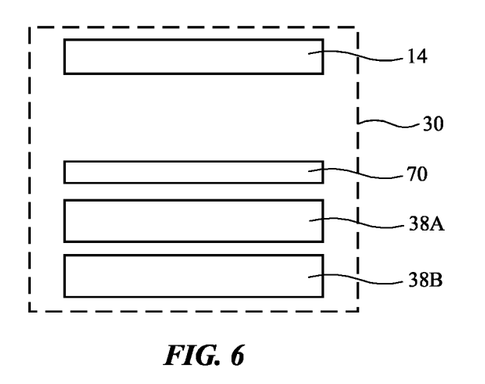
FIGS. 6, 7, and 8 are cross-sectional views of illustrative optical modules with protective structures in accordance with embodiments.
Figure 7:
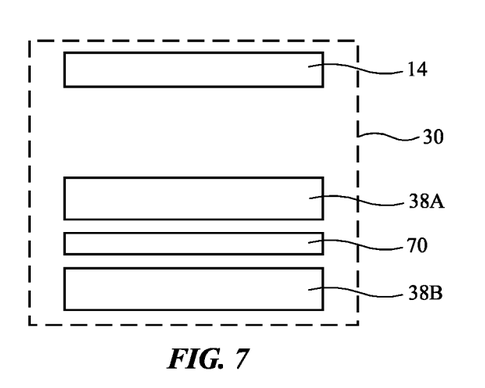
Figure 8:
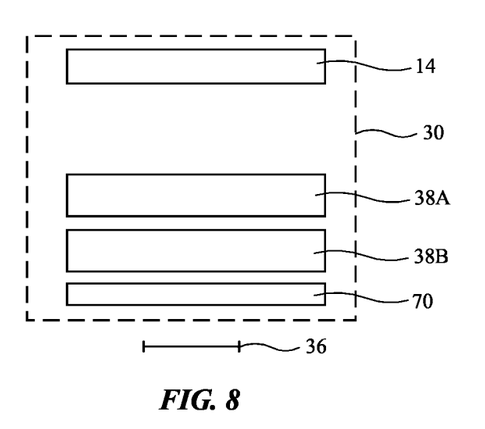

FIGS. 6, 7, and 8 show illustrative locations at which a light blocking structure such as an electrically adjustable shutter may be incorporated into optical modules. In the example of FIG. 6, adjustable shutter 70 (e.g., diaphragm 60 and/or another adjustable shutter) has been placed between lens 38A and display 14. In the example of FIG. 7, adjustable shutter 70 has been mounted in lens 38 between lenses 38A and 38B. FIG. 8 is an example of an illustrative configuration for optical module 30 in which adjustable shutter 70 has been placed on the exterior side of lens 38 (e.g., between lens 38 and eye box 36). More than one of these arrangements may be used in device 10, if desired.

Figure 9:
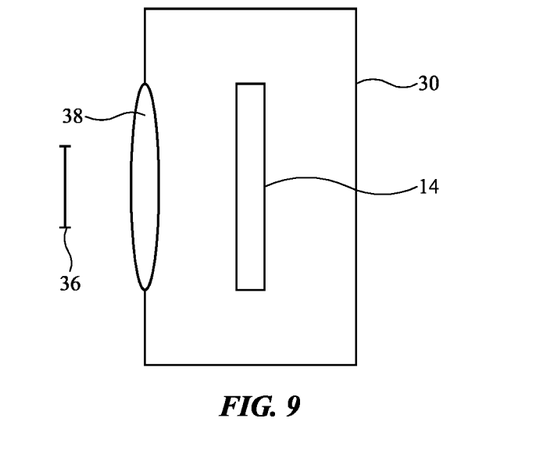
FIGS. 9 and 10 are diagrams of an optical module with a tunable lens being adjusted between a first state for normal operation and a second state to help protect a display in accordance with an embodiment.
Figure 10:
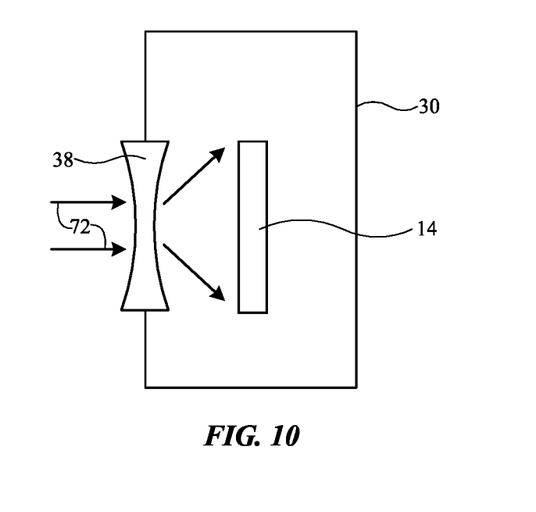

As shown in the illustrative arrangement of FIGS. 9 and 10, lens 38 (e.g., lens 38A and/or lens 38B, etc.) may be provided with an electrically adjustable lens element. This provides lens 38 with the ability to be electrically controlled by circuitry 20. During normal operation (see, e.g., FIG. 9), lens 38 may have a first lens power that allows lens 38 to provide an image from display 14 to eye box 36 for viewing by a user. Lens 38 may, as an example, have a positive lens power. When device 10 is not being used normally (e.g., when device 10 is being turned off, when a head-presence sensor or other sensors 16 detects that device 10 is not being actively used to view content, and/or when a potentially damaging condition has arisen such as the detected presence of sunlight passing through lens 38), lens 38 may be placed in a second state that is different than the state of FIG. 9. Lens 38 may, for example, be adjusted to exhibit a negative lens power or a positive lens power that is significantly different than the normal operation lens power of lens 38. In this situation (which is shown in FIG. 10), ambient light such as sunlight 72 will be spread out and will exhibit a reduced intensity before potentially reaching display 14, rather than being focused onto a portion of display 14 where display 14 could be damaged.

Figure 11:
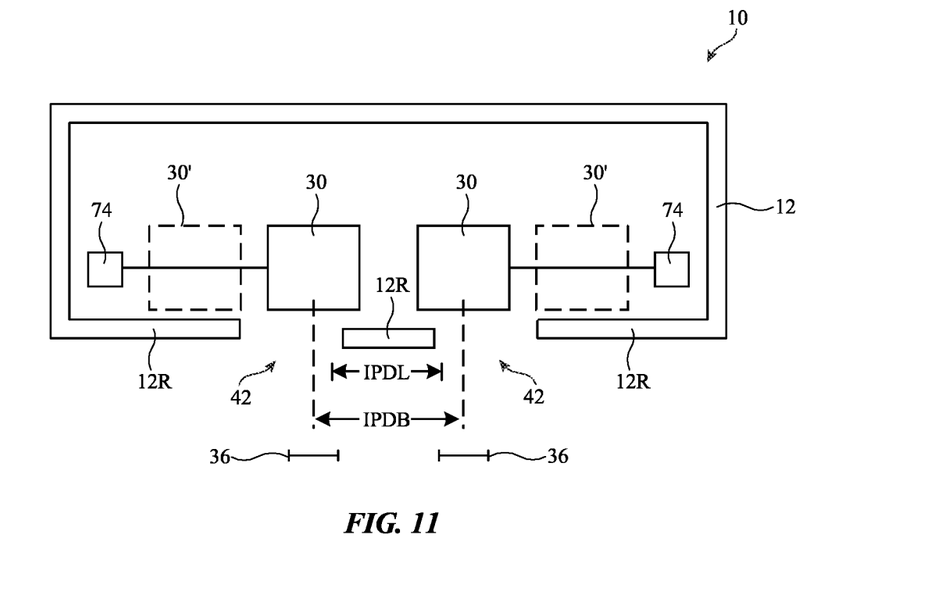
FIG. 11 is a top view of an illustrative electronic device with optical module positioners that move optical modules to safe storage locations overlapped by protective housing structures when not in use in accordance with an embodiment.

FIG. 11 shows how device 10 may have actuators 74 that are electrically controlled by control circuitry 20. Actuators 74 may be used to move optical modules 30 between different positions. For example, during normal operation by a user with a relatively small interpupillary distance IPDL, actuators 74 may move optical modules 30 towards each other. During normal operation by a user with a relatively large interpupillary distance IPDB, actuators (positioners) 74 may be used to move optical modules 30 farther apart. When a condition is detected that indicates that device 10 is not needed for normal operation (e.g., when powered down or when a sensor detects that device 10 has been removed from the user's head or that excessive sunlight is striking display 14), optical modules 30 may be moved out of alignment with openings 42 to protected locations such as locations 30' of FIG. 11 by actuators 74. In this position, modules 30 are protected from ambient light and scratches due to the presence of rear housing portion 12R, which overlaps positions 30'.

Figure 12:
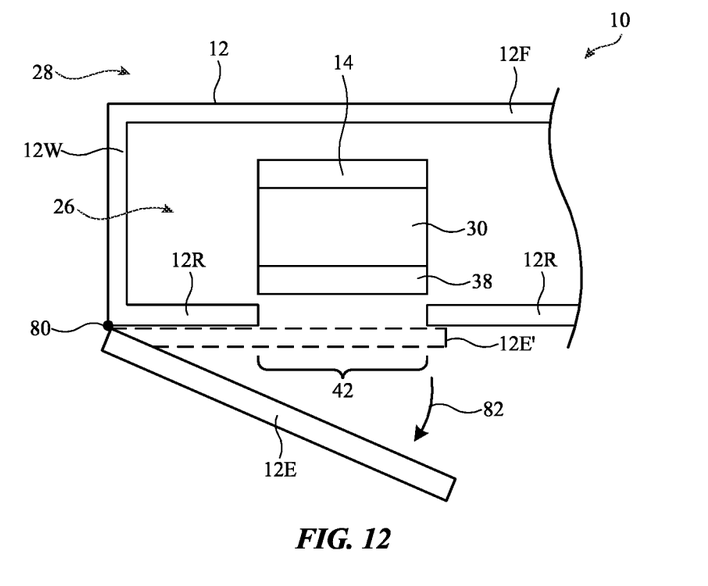
FIG. 12 is a top view of an illustrative electronic device with a manually actuated optical module protective structure in accordance with an embodiment.

If desired, device 10 may have structures that move into and out of place over openings 42. Consider, as an example, device 10 of FIG. 12. As shown in FIG. 12, housing 12 may have a movable structure such as portion 12E. In a first position (e.g., position 12E'), portion 12E covers opening 42. In this first position, lens 38 may be protected from scratches and display 14 may be protected from excessive sunlight exposure. Portion 12E may be attached to housing 12 using a structure that allows portion 12E to move. In the example of FIG. 12, portion 12E is attached to housing 12 using hinge 80. When it is desired to use device 10 normally, a user may move portion 12E in direction 82, thereby uncovering opening 42 and lens 38.

In general, structures such as hinge 80 or other attachment structures may be used to allow sliding movement, rotational movement, bending, and/or other types of movement of portion 12E relative to other portions of housing 12. Housing portions such as portions 12E may form head-mounted support structures (e.g., glasses temples, straps, head-band structures, etc.), may form movable lens covers, and/or may form other structures in device 10. There may be, for example, one of portions 12E on the left of device 10 and another on the right of device, each of which covers a respective opening 42 for a respective optical module 30.

A switch or other sensor may detect movement of housing portion 12E. When portion 12E is covering opening 42, the switch may have a first state. When portion 12E is moved away from opening 42 to uncover opening 42 so that a user may view display 14 through opening 42 and lens 38, the switch may have a second state. Device 10 may, if desired, be powered and depowered or otherwise change its operating mode based on state of the switch. For example, when portion 12E is covering opening 42, device 10 may be turned off (e.g., turned off completely or placed in a low power sleep state), whereas when portion 12E is not covering opening 42, device 10 may be turned on so that device 10 can be used normally by a user to view images.

Closing and opening operations with housing portions such as portion 12E may involve hinged movement, pulling, pushing, sliding, rotating, and/or other movements. To help protect lens 38 and display 14, device 10 may use mechanical covering structures such as movable housing portion 12E of FIG. 12 and/or detachable protective structures such as lens cover 44 of FIG. 3 and/or one or more other protective arrangements (e.g., forming lens 38 from one or more photochromic polymer lens elements, forming lens 38 from one or more photochromic glass lens elements, incorporating an electronically or mechanically operated shutter such as a shutter with movable blades, a liquid crystal shutter, etc.), using optical module actuators 74 to move optical modules 30 to protected locations when not in use, detuning tunable lenses 38 to defocus sunlight, and/or other schemes for protecting lenses 38 and/or displays 14.

Electrically adjustable components may be adjusted to switch protective mechanisms into use based on user input (e.g., user voice input, user button input, user touch sensor input on a display or other touch sensor, etc.) and/or may be adjusted to switch protective mechanisms into use based on sensor readings. The sensor readings may, for example, gather environmental information such as information on the intensity of light striking display 14 (measured, for example, using a photodiode on display 14 or an image sensor or other light sensor in gaze tracking system 40 adjacent to display 14), the temperature of display 14 (which may indirectly measure the intensity of light striking display 14), the motion of device 10 (which may indicate, for example, when device 10 has been picked up by a user in anticipation of normal operation or when device 10 is resting on a table and should be powered down), and/or other conditions. Based on information on whether device 10 is in use or is not in use, whether display 14 and/or lenses 38 are at risk of damage from excessive sun exposure or other conditions, and/or other conditions measured with sensors 16, device 10 can take suitable action (e.g., by opening or closing lens covering structures, by opening or closing electronic shutters, by moving optical modules into a safe location or into their normal operating positions in alignment with openings 42, by adjusting tunable lenses, etc.). Protection may also be provided by invoking these actions manually (e.g., in response to user input). In some situations (e.g., when photochromic lenses are used), ultraviolet light exposure from the sun may be used to automatically darken lenses 38 and thereby protect displays 14. The use of circular polarizers 52 may help suppress undesired light reflections and may therefore be used to enhance display protection in combination with these approaches and/or other suitable approaches.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is illustrative and various modifications can be made to the described embodiments. The foregoing embodiments may be implemented individually or in any combination.

What is claimed is:
1. A head-mounted device, comprising:
a head-mounted housing having a rear housing portion with one or more openings;
left and right displays respectively in left and right optical modules supported by the head-mounted housing;
left and right lenses respectively in the left and right optical modules and through which respective left and right images from the left and right displays are viewable from left and right eye boxes, wherein the left and right images are viewable from the left and right eye boxes through the one or more openings in the rear housing portion;

a sensor; and positioners configured to move, in response to information from the sensor, the left and right optical modules under protective portions of the rear housing portion by moving the left and right optical modules laterally away from first positions overlapping the one or more openings in the rear housing portion to second positions overlapped by the protective portions of the rear housing portion.

2. The head-mounted device defined in claim 1 wherein the left lens comprises a left photochromic lens and wherein the right lens comprises a right photochromic lens.

3. The head-mounted device defined in claim 1 wherein the one or more openings include left and right openings that are respectively aligned with the left and right optical modules, in a first state, to provide the left and right eye boxes with the left and right images and wherein the positioners are configured to move the left and right optical modules out of alignment respectively with the left and right openings, in a second state, to position the left and right optical modules under the protective portions of the rear housing portion.

4. The head-mounted device defined in claim 3 wherein the information from the sensor is indicative of the head-mounted device being powered down, the head-mounted housing not being worn, or sunlight striking the left and right displays.

5. The head-mounted device defined in claim 1 wherein the left and right lenses each comprise a tunable lens configured to change state to help protect a corresponding one of the left and right displays from sunlight when the head-mounted housing is not being worn.

6. The head-mounted device defined in claim 1 wherein the left and right lenses have respective left and right fixed lenses and left and right vision-correction lenses, wherein the head-mounted device comprises left and right circular polarizers, wherein the left circular polarizer is between the left fixed lens and the left vision-correction lens, and wherein the right circular polarizer is between the right fixed lens and the right vision-correction lens.

7. The head-mounted device defined in claim 1 further comprising removable left and right lens caps configured to cover, respectively, the left and right lenses.

8. The head-mounted device defined in claim 1 further comprising left and right shutters configured to protect the left and right displays, respectively.

9. The head-mounted device defined in claim 8 wherein the left and right shutters comprise mechanical shutters.

10. The head-mounted device defined in claim 8 wherein the left and right shutters comprise liquid crystal shutters.

11. The head-mounted device defined in claim 8 wherein the sensor is configured to gather a sensor reading and wherein the left and right shutters are configured to close in response to the sensor reading.

12. A head-mounted device, comprising:
a housing having an opaque front and an opposing rear with left and right openings;
a first magnet attached to the housing;
left and right optical modules aligned, respectively, with the left and right openings, wherein the left optical module has a left display and a left lens through which the left display is viewable, wherein the right optical module has a right display and a right lens through which the right display is viewable;
a left removable vision correction lens having a second magnet removably coupled to the first magnet;
a reflection suppression layer between the left removable vision correction lens and the left lens and configured to absorb ambient light reflections resulting from incoming ambient light received at and reflected outwardly by the left lens; and
protective structures for the left and right optical modules and that are configured to operate in:
a first state in which images from the left and right displays pass respectively through the left and right lenses and left and right openings to corresponding left and right eye boxes; and
a second state in which ambient sunlight is blocked from respectively passing through the left and right lenses to the left and right displays.

13. The head-mounted device defined in claim 12 wherein the protective structures comprise photochromic material in the left and right lenses.

14. The head-mounted device defined in claim 12 further comprising a sensor configured to gather sensor data, wherein the protective structures are configured to change between the first state and the second state based on the sensor data.

15. The head-mounted device defined in claim 14 further comprising a gaze tracking system, wherein the sensor forms part of the gaze tracking system.

16. The head-mounted device defined in claim 14 wherein the sensor comprises a photodetector or a temperature sensor.

17. The head-mounted device defined in claim 12 wherein the reflection suppression layer comprises a circular polarizer.

18. The head-mounted device defined in claim 12 wherein the protective structures comprise a movable portion of the housing.

19. A head-mounted device, comprising:
a head-mounted support structure having a rear housing portion with left and right openings;
optical modules coupled to the head-mounted support structure, wherein the optical modules have displays and have lenses through which images on the displays are viewable through the left and right openings at eye boxes; and
positioners configured to move the optical modules between locations aligned with the left and right openings and characterized by varying degrees of separation between the optical modules to accommodate different interpupillary distances, wherein the positioners are further configured to move the optical modules to protected locations characterized by a degree of separation between the optical modules beyond the varying degrees of separation for accommodating the different interpupillary distances and wherein the optical modules, when in the protected locations, are covered by the rear housing portion and are out of alignment with the left and right openings.

20. The head-mounted device defined in claim 19 wherein the lenses comprise fixed lenses and removable vision correction lenses and wherein the head-mounted device further comprises circular polarizers between the fixed lenses and the removable vision correction lenses.

* * * * *